US010637939B2

(12) United States Patent
Mac Nair et al.

(10) Patent No.: US 10,637,939 B2
(45) Date of Patent: *Apr. 28, 2020

(54) SYSTEMS AND METHODS FOR IDENTIFYING MERCHANT LOCATIONS BASED ON TRANSACTION RECORDS

(71) Applicant: MASTERCARD INTERNATIONAL INCORPORATED, Purchase, NY (US)

(72) Inventors: Bruce W. Mac Nair, Stamford, CT (US); Justin X. Howe, San Francisco, CA (US); Henry Weinberger, New York, NY (US); Po Hu, Norwalk, CT (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/453,373

(22) Filed: Jun. 26, 2019

(65) Prior Publication Data

US 2019/0320406 A1    Oct. 17, 2019

Related U.S. Application Data

(63) Continuation of application No. 14/789,305, filed on Jul. 1, 2015, now Pat. No. 10,382,882.
(Continued)

(51) Int. Cl.
*H04W 4/02*     (2018.01)
*H04W 64/00*    (2009.01)
(Continued)

(52) U.S. Cl.
CPC ......... *H04L 67/18* (2013.01); *G06Q 20/3224* (2013.01); *G06Q 20/389* (2013.01);
(Continued)

(58) Field of Classification Search
CPC ....... H04W 4/02; H04W 60/00; H04W 12/00; G06Q 30/0201; G06Q 30/02013; G06Q 30/0203; H04L 12/14
See application file for complete search history.

(56) References Cited

U.S. PATENT DOCUMENTS

| | | | | |
|---|---|---|---|---|
| 6,598,078 B1 * | 7/2003 | Ehrlich | ................... | H04L 43/00 709/224 |
| 6,718,263 B1 * | 4/2004 | Glass | ..................... | G07B 15/02 455/428 |

(Continued)

FOREIGN PATENT DOCUMENTS

SG    11201701223WA    *   2/2018    .........  G06Q 20/3223

OTHER PUBLICATIONS

U.S. Appl. No. 14/789,305, filed Jul. 1, 2015.
(Continued)

*Primary Examiner* — Tyler W Knox
(74) *Attorney, Agent, or Firm* — Harness, Dickey & Pierce, P.L.C.

(57) ABSTRACT

Disclosed are exemplary embodiments of systems and methods for identifying a merchant location based on transaction records for the merchant. In an exemplary embodiment, a method generally includes accessing multiple router records. Each router record is assigned to one of multiple cells of a grid structure indicative of geographic location. Each router record is associated with a target merchant. The method further includes, for each of the multiple router records, searching for a match between the router record and at least one of multiple transactions at the target merchant, based on time, and reporting one or more of the multiple cells as a location associated with the target merchant, when a number of matching router records assigned to said one or more of the multiple cells exceeds a predetermined threshold.

24 Claims, 7 Drawing Sheets

Related U.S. Application Data

(60) Provisional application No. 62/044,784, filed on Sep. 2, 2014.

(51) Int. Cl.
| | |
|---|---|
| *G06Q 20/32* | (2012.01) |
| *G06Q 20/40* | (2012.01) |
| *H04L 29/08* | (2006.01) |
| *G06Q 20/38* | (2012.01) |

(52) U.S. Cl.
CPC ........... *G06Q 20/40* (2013.01); *G06Q 20/405* (2013.01); *H04W 4/02* (2013.01); *H04W 64/00* (2013.01)

(56) References Cited

U.S. PATENT DOCUMENTS

| | | | | |
|---|---|---|---|---|
| 6,778,524 | B1* | 8/2004 | Augart | H04L 29/06 370/248 |
| 7,734,513 | B2* | 6/2010 | Bonner | G01S 5/14 370/406 |
| 8,706,557 | B1* | 4/2014 | Tavares | G06Q 40/10 705/21 |
| 8,868,522 | B1* | 10/2014 | Zennaro | G06F 16/29 707/694 |
| 8,918,506 | B1* | 12/2014 | Clubb | G06Q 20/105 709/226 |
| 9,615,347 | B1* | 4/2017 | Kerr | H04W 4/80 |
| 9,898,749 | B2* | 2/2018 | Argue | G06Q 30/0201 |
| 2002/0101967 | A1* | 8/2002 | Eng | G04M 15/00 379/114.01 |
| 2002/0120846 | A1* | 8/2002 | Stewart | G06Q 20/04 713/168 |
| 2004/0030626 | A1* | 2/2004 | Libman | G06Q 10/10 705/36 R |
| 2004/0243503 | A1* | 12/2004 | Eng | G06Q 30/04 705/37 |
| 2005/0097015 | A1* | 5/2005 | Wilkes | G06Q 20/02 705/30 |
| 2006/0253590 | A1* | 11/2006 | Nagy | H04L 67/125 709/226 |
| 2010/0049615 | A1* | 2/2010 | Rose | G06Q 20/02 705/17 |
| 2011/0004830 | A1* | 1/2011 | Von Kaenel | G06Q 40/08 715/751 |
| 2011/0238517 | A1* | 9/2011 | Ramalingam | G06Q 20/40 342/357.51 |
| 2011/0287748 | A1* | 11/2011 | Angel | H04M 3/42221 455/414.1 |
| 2012/0089713 | A1* | 4/2012 | Carriere | H04L 12/4641 709/222 |
| 2012/0094639 | A1* | 4/2012 | Carlson | H04W 4/029 455/414.1 |
| 2012/0190386 | A1* | 7/2012 | Anderson | G01C 15/04 455/456.3 |
| 2012/0239479 | A1* | 9/2012 | Amaro | G06Q 20/3224 705/14.23 |
| 2012/0239500 | A1* | 9/2012 | Monahan | H04L 67/26 705/14.58 |
| 2012/0290389 | A1* | 11/2012 | Greenough | G06Q 30/0261 705/14.53 |
| 2013/0054358 | A1* | 2/2013 | Ross | G06Q 30/00 705/14.53 |
| 2013/0117155 | A1* | 5/2013 | Glasgo | G06Q 30/00 705/26.35 |
| 2013/0275181 | A1* | 10/2013 | DiGioacchino | G06Q 30/0201 705/7.29 |
| 2014/0006107 | A1* | 1/2014 | Groarke | G06Q 30/02 705/7.34 |
| 2014/0201043 | A1* | 7/2014 | Arditi | G06Q 40/10 705/30 |
| 2014/0337173 | A1* | 11/2014 | Hardie | H04W 4/185 705/26.41 |
| 2014/0337232 | A1 | 11/2014 | Glasgo | |
| 2014/0365304 | A1* | 12/2014 | Showers | G06Q 30/02 705/14.55 |
| 2015/0026181 | A1* | 1/2015 | Milton | G06Q 30/0269 707/737 |
| 2015/0051953 | A1* | 2/2015 | Howe | G06Q 30/0205 705/7.34 |
| 2015/0126148 | A1* | 5/2015 | Hong | H04W 4/029 455/405 |
| 2016/0066136 | A1* | 3/2016 | Mac Nair | G06Q 20/389 455/456.1 |

OTHER PUBLICATIONS

U.S. Appl. No. (a) Office Action dated Dec. 12, 2017; (b) Office Action dated Sep. 6, 2018; (c) Office Action dated Dec. 10, 2018; and (d) Notice of Allowance dated Mar. 27, 2019. The instant application is a continuation of U.S. Appl. No. 14/789,305.

PCT/US2015/047430: International Search Report and Written Opinion (11 pages), dated Dec. 23, 2015. PCT/US2015/047430 has a priority claim in common with the instant application.

AU 2015312230: Australian Examination Report dated Mar. 18, 2018 (6 pgs.). AU 2015312230 is a National Phase of PCT Patent Application PCT/US2015/047430, which has the same priority claim as the instant application.

CA 2,959,154: (a) Canadian Office Action dated Dec. 15, 2017 (4 pgs.), and (b) Canadian Office Action dated Nov. 23, 2018 (8 pgs.). CA 2,959,154 is a National Phase of PCT Patent Application PCT/US2015/047430, which has a priortiy claim in common with the instant application.

EP 15838123.6: European Extended Search Report, dated Feb. 27, 2018 (11 pgs.). EP 15838123.6, is a National Phase of PCT Patent Application PCT/US2015/047430, which has a priority claim in common with the instant application.

SG 11201701223W: (a) Singapore Written Opinion dated Jul. 26, 2017 (5 pgs.); and (b) Singapore Notice of Eligibility for Grant dated Feb. 1, 2018 (11 pgs.). SG 11201701223W is a National Phase of PCT Patent Application PCT/US2015/047430, which has a priority claim in common with the instant application.

U.S. Appl. No. 14/789,305, filed Jul 1, 2015, Mac Nair et al.
U.S. Appl. No. 13/969,839, filed Aug. 19, 2013, Howe.

* cited by examiner

| A | F | K | P | <u>116b</u> U |
|---|---|---|---|---|
| B | G | L | Q | V |
| C | H | <u>116a</u> M | R | W |
| D | I | N | S | X |
| E | J | O | T | <u>116c</u> Y |

FIG. 5

| A<br>0/3 | F | K | P<br>4/103 | U |
|---|---|---|---|---|
| B<br>1/10 | G<br>6/24 | L | Q | V |
| C<br>2/22 | H | M | R | W |
| D | I | N | S | X |
| E | J | O | T | Y<br>0/0 |

FIG. 6

SYSTEMS AND METHODS FOR IDENTIFYING MERCHANT LOCATIONS BASED ON TRANSACTION RECORDS

CROSS-REFERENCE TO RELATED APPLICATIONS

This application is a continuation of U.S. patent application Ser. No. 14/789,305 filed on Jul. 1, 2015, which claims the benefit of, and priority to, U.S. Provisional Application No. 62/044,784 filed on Sep. 2, 2014. The entire disclosure of each of the above applications is incorporated herein by reference.

FIELD

The present disclosure relates to systems and methods for identifying a merchant location based on transaction records associated with the merchant.

BACKGROUND

This section provides background information related to the present disclosure which is not necessarily prior art.

Known mobile devices permit users to view their current locations on map applications. Such mobile devices generally rely on Global Positioning System (GPS) signals to determine the locations. Accuracy of the locations is impacted by the mobile devices' ability to obtain GPS signals, especially when the mobile devices are disposed within buildings (i.e., indoors), or when one or more sections of the sky is obscured. Ground-based references are also known to be used to enhance the accuracy of the determined locations. Separately, merchants are known to transact with consumers for the sale of goods and services. Transactions are commonly funded through payment accounts associated with the consumers, whereby transaction data is generated and stored for each transaction. The transaction data often includes payment account numbers, merchant identifiers and dates/times of transactions.

DRAWINGS

The drawings described herein are for illustrative purposes only of selected embodiments and not all possible implementations, and are not intended to limit the scope of the present disclosure.

FIG. 5 is the exemplary graph of FIG. 4 associated with an exemplary grid structure;

FIG. 6 is the exemplary grid structure of FIG. 5 with counts for records per cell matched according to the method of FIG. 3.

Corresponding reference numerals indicate corresponding parts throughout the several views of the drawings.

DETAILED DESCRIPTION

Example embodiments will now be described more fully with reference to the accompanying drawings.

Certain merchants are covered by wireless networks generated from multiple different routers, especially closely located merchants in shopping malls, airports, etc. The routers may be associated with, or even operated by, the merchants. As consumers move through the merchants (i.e., through locations associated with the merchants), portable communication devices associated with the consumers are able to identify the routers and generate router records, which reflect the names and signal strengths of the routers. The systems and methods herein identify merchant locations by correlating the router records with transaction records involving the merchants. One example system generates a grid structure of cells, which corresponds to a geographic location including and surrounding a target merchant. Router records associated with the target merchant are assigned to cells of the grid structure. The router records are then matched with transaction records of the target merchant, in order to identify the router or the target merchant location in one of the cells of the grid structure. One or more example systems further, or alternatively, match the router records and the transaction records based on time, and not to a grid structure, to identify the target merchant location. By identifying the merchant location, rules and/or processes for determining location based on router signals may be modified to more accurately determine locations of portable communication devices when at certain merchants, including indoor merchants, etc.

Figure 1:
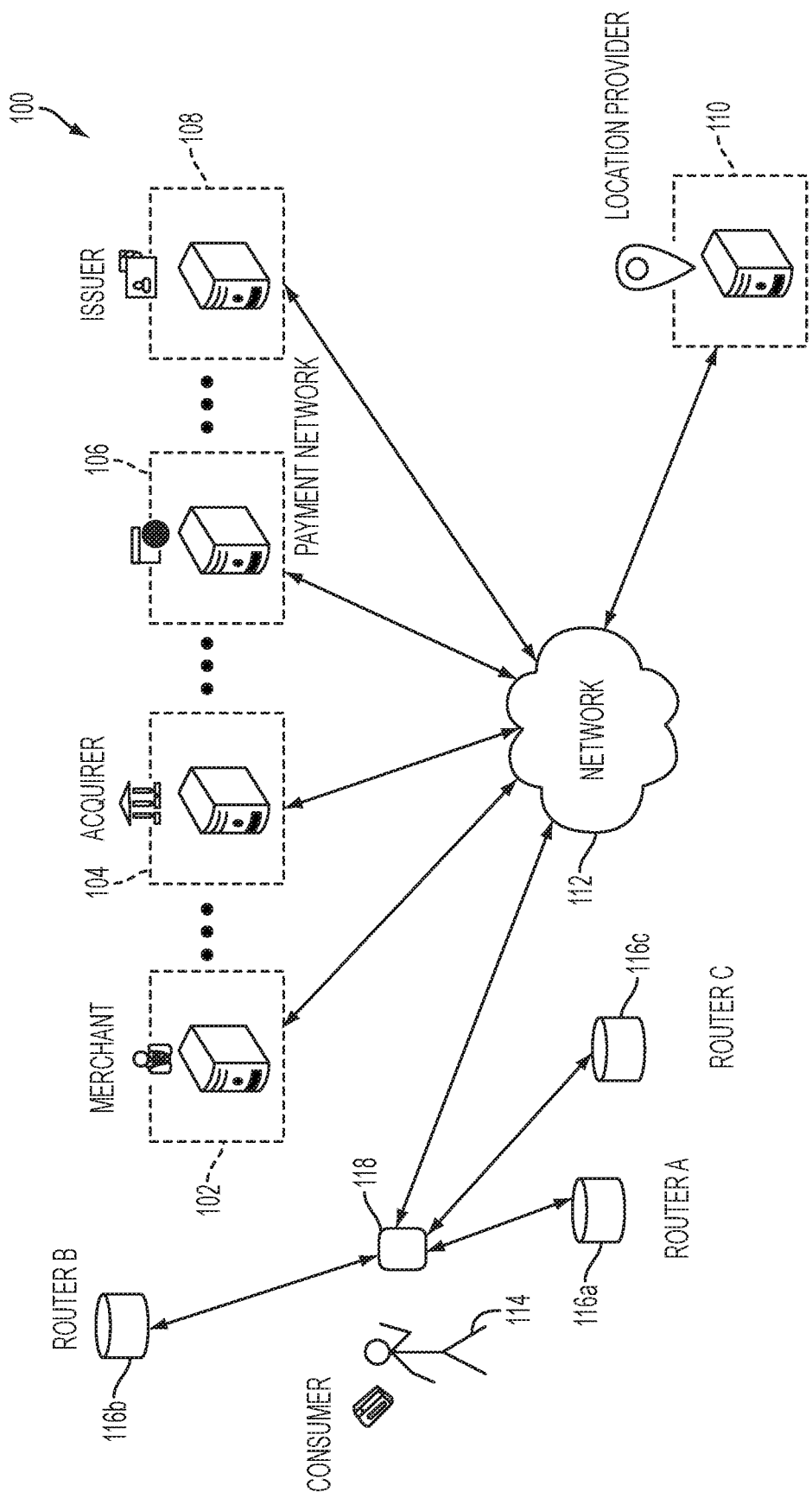
FIG. 1 is a block diagram of an exemplary system of the present disclosure suitable for use in identifying merchant locations.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on authorization processes for payment card transactions and/or location identification processes.

Referring to FIG. 1, the system 100 generally includes a merchant 102, an acquirer 104, a payment network 106, an issuer 108, and a location provider 110, each coupled to network 112. The system 100 further includes multiple routers 116, each generally associated with the merchant 102. The routers 116 may be operated by the merchant 102, or they may be in close proximity to the geographic location of the merchant 102. As used herein, the term "router" should be understood broadly to include a variety of different devices, which generate network(s) and/or provide access to network(s), often wireless network(s). For purposes of clarity, only three wireless routers 116a-c are illustrated in FIG. 1. It should be understood the same or a different number of routers may be employed in other embodiments.

A consumer 114 is further illustrated, and the consumer 114 is associated with a portable communication device 118, such as, for example, a smartphone or tablet. The consumer 114 may include, for example, a purchaser, an institutional purchaser, a business, or any other entity that purchases products, including, e.g., goods or services, etc. The portable communication device 118 associated with the consumer 114, in this exemplary embodiment, is within a range of each of the routers 116, as indicated by arrows. The portable communication device 118 is further coupled to network 112, directly, or indirectly, through one or more of routers 116. In this example, the routers 116 are unhidden and can be recognized by the portable communication device 118. The routers 116 may be public, private, secured or unsecured. The network 112 may include, without limitation, a local area network (LAN), a wide area network (WAN) (e.g., the Internet, etc.), a mobile network, a virtual network, and/or another suitable public and/or private network capable of supporting communication among two or more of the components illustrated in FIG. 1, or even combinations thereof. For example, network 112 may include multiple different networks, such as a private payment transaction network made accessible by the payment network 106 to the acquirer 104 and the issuer 108, and separately, a public network (e.g., the Internet), which the merchant 102, the location provider 110 and/or the portable communication device 118 may access.

It should be appreciated that the system 100 is provided for illustrative purposes only, and should not be understood to limit the present disclosure. Different arrangements of the system 100 may be employed in other embodiments, depending on, for example, the location of a target merchant, the proximity of adjacent merchants, the number and/or concentration of routers associated with the merchants, and various other factors associated with transactions, routers, location specific data, etc.

Figure 2:
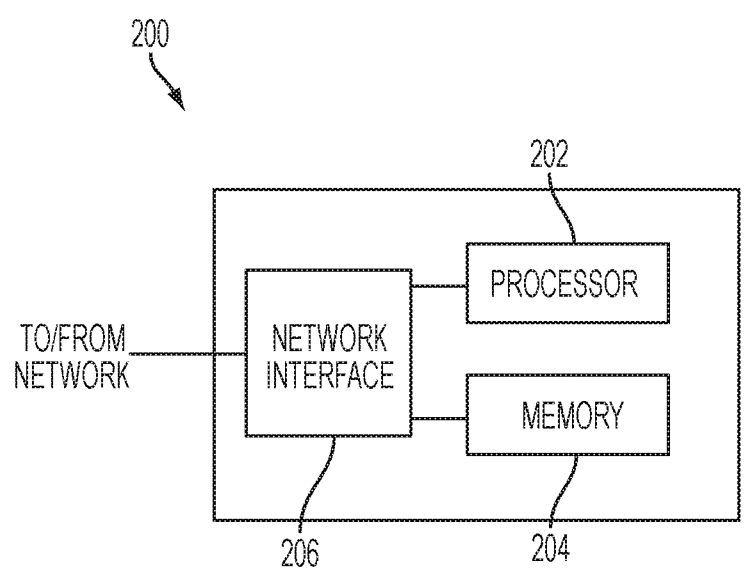
FIG. 2 is a block diagram of a computing device, that may be used in the exemplary system of FIG. 1.

Each of the merchant 102, the acquirer 104, the payment network 106, the issuer 108, and the location provider 110 may be implemented in one or more computing devices, such as a computing device or multiple computing devices located together, or distributed across a geographic region. Further, in this exemplary embodiment, the portable communication device 118 may further be implemented as a computing device, such as, for example, a smartphone, a tablet, or another mobile network enabled device. For illustration, the system 100 is described below with reference to an exemplary computing device 200 illustrated in FIG. 2. In general, the computing device 200 may include, for example, one or more servers, workstations, personal computers, laptops, smartphones, tablets, PDAs, point of sale terminals, personal navigation device (PND), etc. The system 100 and parts therein, however, should not be considered to be limited to the computing device 200, as different computing devices and/or arrangements of computing devices may be used in other embodiments.

The exemplary computing device 200 includes a processor 202 and a memory 204 coupled to the processor 202. The processor 202 may include, without limitation, a central processing unit (CPU), a microprocessor, a microcontroller, a programmable gate array, an ASIC, a logic device, or the like. The memory 204 is a computer readable media, which includes, without limitation, random access memory (RAM), a solid state disk, a hard disk, compact disc read only memory (CD-ROM), erasable programmable read only memory (EPROM), tape, flash drive, and/or any other type of volatile or nonvolatile physical or tangible computer-readable media. Memory 204 may be configured to store, without limitation, transaction records, router records, predetermined intervals, predetermined thresholds, merchant IDs, router databases, router tables, geographic data, and/or other types of data suitable for use as described herein.

The computing device 200 further includes a network interface 206 coupled to the processor 202. The network interface 206 may include, without limitation, a wired network adapter, a wireless network adapter, a mobile and/or cellular telecommunications adapter, or other device capable of communicating to one or more different networks, including the network 112. In at least one embodiment, computing device 200 includes processor 202 and one or more network interfaces 206 incorporated into or with processor 202.

Referring again to FIG. 1, in the illustrated system 100, the merchant 102, the acquirer 104, the payment network 106, and the issuer 108 cooperate, in response to a request from the consumer 114, for example, to complete a payment account transaction. The consumer 114 initiates the transaction by presenting a payment device, such as a credit card, a debit card, a pre-paid card, payment fob, and/or the portable communication device 118 with a payment account application, etc., to the merchant 102.

As an example, in a credit transaction in the system 100, the merchant 102 reads the payment device and communicates an authorization request (e.g., including a payment account number and an amount of the purchase, etc.) to the acquirer 104 to determine whether the payment account is in good standing and whether there is sufficient credit to complete the transaction. The acquirer 104, in turn, communicates the authorization request with the issuer 108, through a payment network 106, such as, for example, MasterCard®, VISA®, Discover®, American Express®, etc. If the issuer 108 accepts the transaction, a reply authorizing the transaction is provided back to the merchant 102, thereby permitting the merchant 102 to complete the transaction. The transaction is later cleared and/or settled by and between the merchant 102, the acquirer 104, and the issuer 108. If the issuer 108 declines the transaction, a reply declining the transaction is provided back to the merchant 102, thereby permitting the merchant 102 to stop the transaction. While the above transaction is described with reference to a credit account, payment account transactions may further include other transactions, such as debit transactions and pre-paid transactions, as suggested above. For debit and pre-paid accounts, a transaction is substantially similar to the above, but may further include the use of a personal identification number (PIN) authorization and more rapid posting of the charge to the payment account, etc.

Transaction data is generated, collected, and stored as part of the above interactions among the merchant 102, the acquirer 104, the payment network 106, the issuer 108, and the consumer 114. The transaction data includes a plurality of transaction records, one for each transaction, or attempted transaction. The transaction records, in this exemplary embodiment, are stored at least by the payment network 106, in memory 204 of computing device 200. Additionally, or alternatively, the merchant 102, the acquirer 104, and/or the issuer 108 may store the transaction records in memory 204 of their corresponding computing device 200, or transaction records may be transmitted between parts of system 100. The transaction records include, for example, payment account numbers, amounts of the transactions, merchant IDs, and dates/times of the transactions. It should be appreciated that more or less information related to transactions, as part of either authorization or clearing and/or settling, may be included in transaction records and stored within the system 100, at the merchant 102, the acquirer 104, the payment network 106 and/or the issuer 108.

Apart from the transaction, the portable communication device 118 associated with the consumer 114 generally moves with the consumer 114 as the consumer 114 moves from location to location, within a location of the merchant 102, by the location of the merchant 102, or between the location of the merchant 102 and another merchant location. As the consumer 114 moves, the portable communication device 118 moves relative to the routers 116a-c, and relative to additional other routers located generally proximate to the merchant 102 (not shown). As the portable communication device 118 moves, its recognition of the routers 116*a-c*, and the signal strength of the routers 116 at the portable communication device 118, change. The portable communication device 118 generates router records, often periodically, which indicate at least which of the routers 116*a-c* are recognized and the relative signal strength of the recognized routers 116. In this exemplary embodiment, a router record includes a name(s) of the router(s) recognized, a signal strength of the recognized router(s) at the portable communication device 118, a date and a time. Different or additional information may be included in router records in other embodiments, including, for example, user identification (ID) for the portable communication device 118, the GPS location of the portable communication device 118, etc.

The router records, in this example embodiment, are gathered by the portable communication device 118 and provided to the location provider 110, or to other parts of system 100, in real-time, or periodically or intermittently, as desired. For example, in some embodiments, the portable communication device 118 generates and then stores router records for a period of time (e.g., 3 hours, 6 hours, 2 days, 1 week, etc.), and then transmits the router records to the location provider 110. In other embodiments, the portable communication device 118 transmits the router records in real-time or near real-time, for example, when they are generated. In still other embodiments, the location provider 110 retrieves the router records from the portable communication device 118 (e.g., in real-time, or periodically, or intermittently at some later time).

While only one portable communication device 118 is illustrated in the system 100 of FIG. 1, it should be understood that multiple portable communication devices may be included in the system 100 (and associated with the consumer 114 or with multiple other consumers), and that router records may be generated by any number of portable communication devices and provided to the location provider 110. In numerous embodiments, the location provider 110 will receive and/or retrieve router records from dozens, hundreds or thousands of, or more, portable communication devices, etc.

Once received and/or retrieved, the location provider 110, or other part of system 100, stores the router records in memory 204 of corresponding computing device 200. The location provider 110 may include additional information in the router records, before or after storing the router records in the memory 204. In this exemplary embodiment, the location provider 110 searches, in a router database, stored in memory 204, for one or more of the router names included in the router records. The router database includes associations between the router names and names, addresses, and/or IDs of corresponding merchants (e.g., the merchant 102, etc.). When a router name is included in the router database, the location provider 110 appends the associated merchant name, merchant address, and/or merchant ID to the router records. It should be appreciated that, in other embodiments, the location provider 110 may append a merchant name, merchant address, and/or merchant ID to the router record in one or more other ways (e.g., without reference to a router database, etc.).

In at least one embodiment, the router record may include a merchant name, merchant address and/or merchant ID when received from the portable communication device 118.

An example router record is included in TABLE 1. As shown, the router record includes a record ID, a user ID, router data points including the router name/signal strength for each detected router, a merchant identifier, a date, and a time. Like the merchant ID, the record ID is appended to the router record by the location provider 110. The record ID is unique to the router record, and is usable to distinguish different router records from one another. The user ID, in this example, is provided from the portable communication device 118 and is indicative of the portable communication device 118. It should be appreciated that the user ID may be omitted in one or more embodiments, for example, to disassociate the router record from the portable communication device 118, or consumer 114 associated therewith.

TABLE 1

| Record ID | User ID | Router 1 Data | Router 2 Data | Router 3 Data | Merchant ID | Date | Time |
| --- | --- | --- | --- | --- | --- | --- | --- |
| 1234 | 6789 | "116a"/0.93 | "116b"/0.20 | "116c"/0.16 | 456789 | MM/DD/YYYY | 14:03:52 |

It should be appreciated that the above router record is exemplary in nature and provided for purposes of illustration only, and that router records may vary in form, content, etc., in other embodiments.

Figure 4:
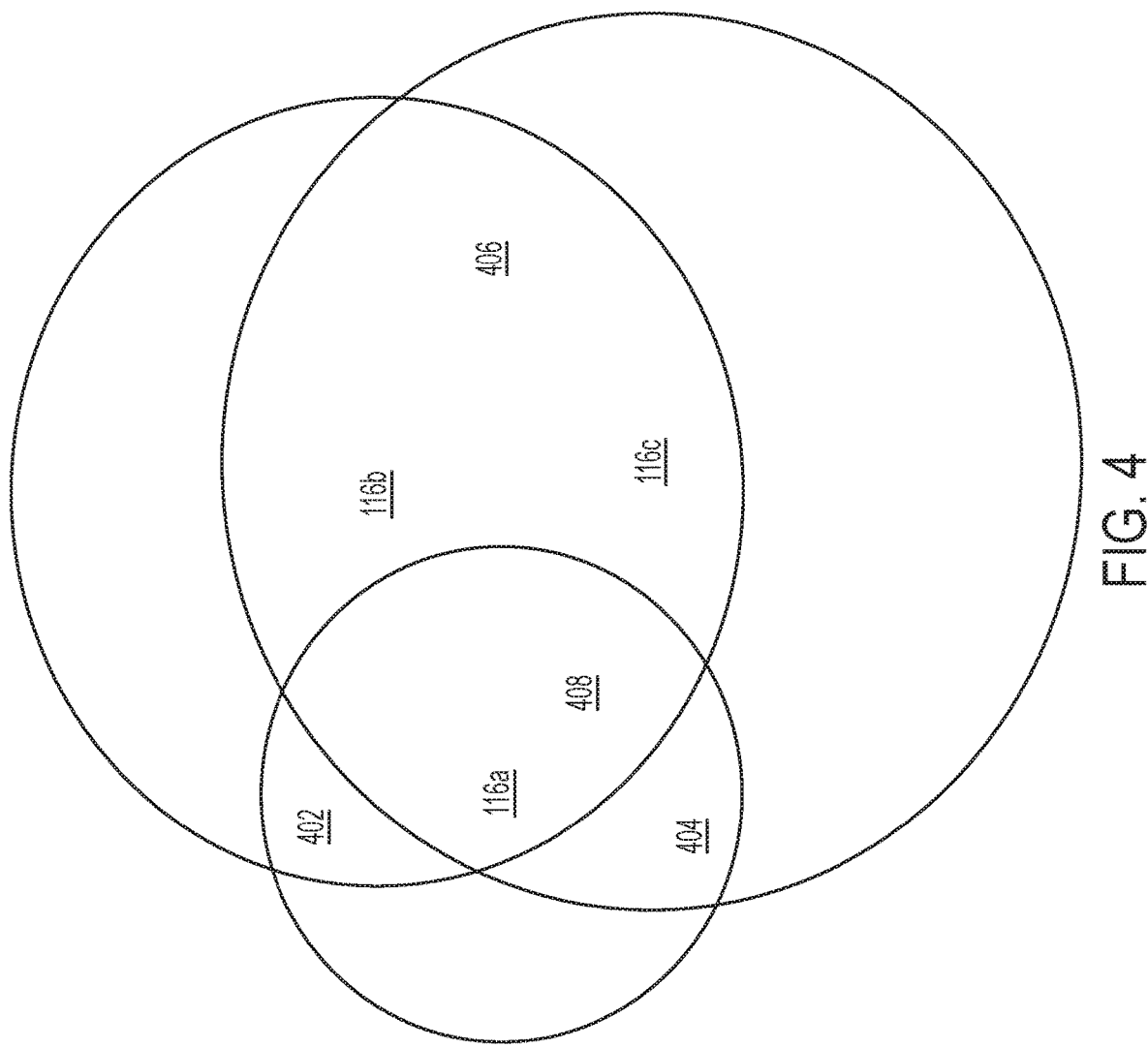
FIG. 4 is an exemplary graph of multiple routers included in the system of FIG. 1.

FIG. 4 illustrates a router graph for the routers 116*a*, 116*b*, and 116*c*, from TABLE 1. The router graph indicates the relative location between the routers 116*a-c*, and the coverage or wireless network of the routers 116*a-c*. The references 402, 404, and 406 indicate the regions of overlap between two of the routers 116*a-c*, while the reference 408 indicates a region of overlap between all three networks from routers 116*a-c*. For example, based on the router graph shown in FIG. 4, a portable communication device may be positioned within the wireless networks of any of the routers 116*a-c*, or any two of the routers. Based on the exemplary router record of TABLE 1, however, because a signal strength, or intensity, for each of the routers 116*a-c* is present, it is clear the portable communication device is located within region 408, i.e., where each of the wireless networks, associated with routers 116*a-c*, overlap. As described above, a different number of routers may be indicated in other embodiments, often dependent on the concentration and/or arrangement of merchants or others associated with the routers. For example, routers, and their corresponding wireless network(s), may be more concentrated and may overlap more often in certain merchant environments, such as, for example, a shopping mall, or a multiple level building, as compared to a standalone department store.

The location provider 110 may further process and/or filter the router records based on the methods described herein. For example, the location provider 110 may filter, delete or eliminate router records associated with the consumer 114, when the location (as indicated by the router names/signal strengths) changes more than, for example, 30 meters in 30 seconds. Such a change in location may indicate that the consumer 114 is on-the-move, and not "at rest" or present at the merchant 102 to complete a transaction. It should be appreciated that a variety of distances/times, and/or a variety of other factors, may be employed to filter the router records, if desired, when the consumer 114

(or other consumers) is on-the-move. It should further be appreciated that the router records may be processed by the location provider 110 to otherwise filter out, weight, or enhance the router records for more efficient and/or more accurate use of the records in the methods herein. In numerous embodiments, all or substantially all router records may be used in a variety of different forms in the construction of a router graph, including, for example, similar to the router graph shown in FIG. 4.

Figure 3:
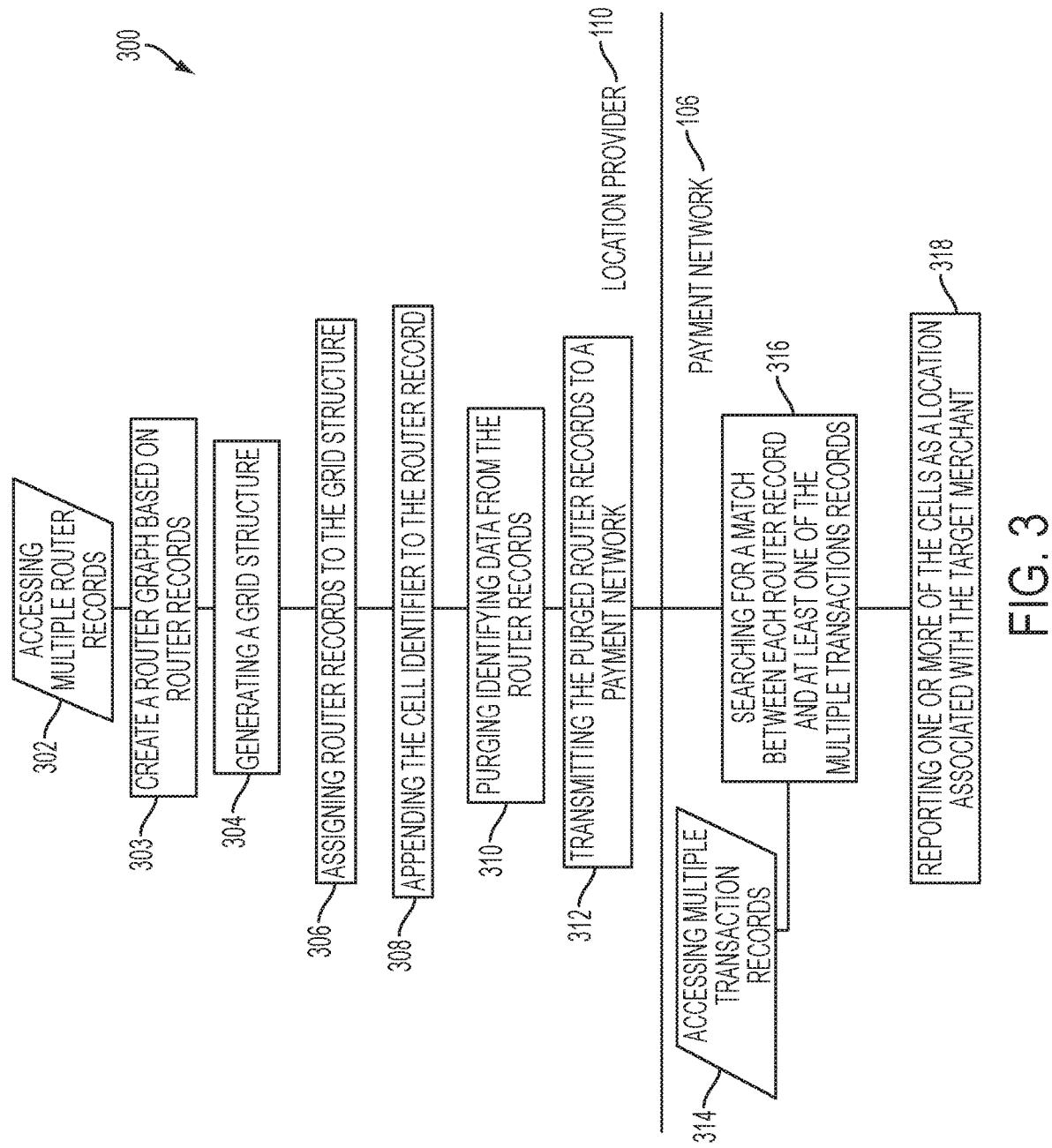
FIG. 3 is an exemplary method for use in identifying a merchant location based on transaction records associated with the merchant, that may be used in the system of FIG. 1.

FIG. 3 illustrates an exemplary method 300 for identifying, based on one or more transaction records, a location of a target merchant. The method 300 is described with reference to the system 100, and in particular, as operations of the location provider 110 and the payment network 106. It should be appreciated, however, that the method 300 may be implemented in any one or more of the merchant 102, the acquirer 104, the payment network 106, the issuer 108, and the location provider 110 of the system 100, as described above. Further, it should be appreciated that the methods described herein are not limited to the system 100. And, conversely, the systems described herein are not limited to the exemplary method 300.

As shown in FIG. 3, the location provider 110 accesses, at 302, the router records stored in memory 204. The location provider 110 generally accesses the router records based on a merchant ID of a target merchant, which, in this exemplary embodiment, is merchant 102. When a merchant ID is not included in the router records, other information (e.g., merchant name and/or merchant address, etc.) may be used to access the router records. At 303, the location provider 110 creates a router graph based on the multiple accessed router records. The router graph is indicative of the relative interactions between the multiple routers 116a-c. It should be appreciated that the router graph is different in various embodiments, depending on, for example, the number of routers in or around a particular geographic location and/or the relative interaction therebetween, etc. As described above, FIG. 4 illustrates an exemplary router graph.

At 304, the location provider 110 generates a grid structure associated with the target merchant 102 and/or the accessed router record. The grid structure includes multiple cells, which are mutually exclusive of one another. Generally, the grid structure is generated by the location provider 110 through agglomerative distance based clustering of the router graph shown, for example, in FIG. 4, based on minimum inferred distances, and/or through a comparable classification process (based on router records, collected by portable communication devices). The grid, for example, may be developed by the location provider 110, by clustering the observation router records. Each router record represents a portable communication device (e.g., by User ID, etc.), and associated clustering variables are shown in TABLE 2.1 (at time=1) and TABLE 2.k (at time=k), with each TABLE including 1-N records, each indicative of a determined intensity, or signal strength of particular routers, I-1 through I-3, relative to multiple portable communication devices, i.e., 1, 2, 3, 4 . . . N. It should be appreciated that the router records provided below are merely exemplary, as any different number of router records, from any different number of portable communication devices, for a different number of routers, may be processed as described herein.

TABLE 2.1

| User ID | Intensity measured at T = 1 | | |
|---|---|---|---|
| Obs | I-1 | I-2 | I-3 |
| 1 | 0.234 | 0.344 | 0.222 |
| 2 | 0.212 | 0.236 | 0.212 |
| 3 | 0.780 | 0.899 | 0.991 |
| 4 | 0.855 | 0.935 | 0.789 |
| . . . | | | |
| N | 0.815 | 0.941 | 0.885 |

TABLE 2.k

| UserID | Intensity measured at T = k | | |
|---|---|---|---|
| Obs | I-1 | I-2 | I-3 |
| 1' | 0.718 | 0.890 | 0.944 |
| 2' | 0.880 | 0.955 | 0.888 |
| 3' | 0.830 | 0.922 | 0.897 |
| 4' | 0.12 | 0.235 | 0.221 |
| . . . | | | |
| N' | 0.23 | 0.222 | 0.242 |

The statistical distance cluster analysis would then be performed, on the router record included in TABLES 2.1 through TABLE 2.k (for each intermediate time therebetween), by the location provider 110, to identify clusters (e.g., X clusters, etc.) from the observations for the multi-dimensional intensities (or signal strengths). The multiple dimensions include, in this embodiment, time, and different portable communication devices, from which the records (included in TABLES 2.1-2.k) are determined.

The intensity (or signal strength) range for each cluster is used, by the location provider 110, to define a center of the cluster, and the standard deviation from the cluster center, as shown, for example in TABLE 3. As shown, the router records are divided into two clusters: cluster 1 and cluster 2. The average signal strength of cluster 1 is the average of each of the signals strengths for each of the different routers, I-1 through I-3, etc. The standard deviation is then determined, by the location provider 110, through known methods, from the center of the clusters.

TABLE 3

| | | Signal Strength (or Intensity) | | |
|---|---|---|---|---|
| Obs | Cluster | I-1 | I-2 | I-3 |
| 1 | 1 | 0.234 | 0.344 | 0.222 |
| 2 | 1 | 0.212 | 0.236 | 0.212 |
| 4' | 1 | 0.12 | 0.235 | 0.221 |
| N' | 1 | 0.23 | 0.222 | 0.242 |
| Center of cluster 1 | | 0.199 | 0.259 | 0.224 |
| STDEV 1 | | 0.054 | 0.057 | 0.013 |
| 3 | 2 | 0.780 | 0.899 | 0.991 |
| 4 | 2 | 0.855 | 0.935 | 0.789 |
| N | 2 | 0.815 | 0.941 | 0.885 |
| 1' | 2 | 0.718 | 0.890 | 0.944 |
| 2' | 2 | 0.880 | 0.955 | 0.888 |
| 3' | 2 | 0.830 | 0.922 | 0.897 |
| Center of cluster 2 | | 0.813 | 0.924 | 0.899 |
| STDEV 2 | | 0.058 | 0.025 | 0.068 |

It should be appreciated that because customers linger at merchants (e.g., POS terminals, products of interest, etc.), as compared to locations around the merchants (e.g., walkways, parking lots, etc.), the router records, when organized in this manner, provide averages that are likely located at the merchant. The density of the observed signal strengths will nonetheless, due to movement of the portable communication device 118 over feet or tens of feet, decay quickly from the cluster center (e.g., due to portable communication devices moving through and/or between merchants, etc.), As such, the cluster is defined, in various examples, by the intensity range of the first or second standard deviation around the cluster center. Specifically, for example, cluster 2, from TABLE 3, may be defined by TABLE 4, below.

TABLE 4

|  | I-1 | I-2 | I-3 |
|---|---|---|---|
| min | 0.755 | 0.898 | 0.831 |
| max | 0.871 | 0.949 | 0.967 |

Cluster ranges, in a variety of embodiments, may further be made contiguous, so each cluster represents a cell in the grid, and the entire merchant is covered by the grid. The grid structure, and the included cells, for example, often vary in size and/or proportion depending on, without limitation, location of the target merchant 102, locations of merchants in close proximity to the target merchant 102, concentrations of merchants, locations and/or concentrations of routers, etc. In at least one embodiment, the grid structure is generated, such that no more than one merchant is included in each cell, yet one merchant may be disposed in multiple cells. The grid structure is generated so that each router record, for the target merchant 102, is assignable to a single cell. Further, the grid structure may represent a 2-dimensional space or a 3-dimensional space, and may be linear or non-linear (e.g., a Voronoi diagram, etc.).

An exemplary grid structure, generated consistent with the above description, where each cell is a cluster of router records, is overlaid on the graph of routers 116a-c, as illustrated in FIG. 5.

After generating the grid structure, at 304, the location provider 110 assigns, at 306, each of the multiple router records to a cell of the grid structure based on the router names and/or signal strengths of the routers 116a-c. Once assigned, a corresponding cell designation is appended to the router record, at 308. With reference to the example record of TABLE 1, the record is assigned, by the location provider 110, to cell "G" and the designation "G" is appended to the router record. The exemplary router record, as modified, is provided in TABLE 5.

Additionally, or alternatively, the location provider 110 may purge other information from router records, including information potentially unrelated to the portable communication device 118, or consumer 114, for example, to provide efficient transmission of the router records. For example, after the grid cells are assigned and appended to the router records, the router specific information (e.g., router names and signal strength, etc.) may be purged from the router records. In at least one embodiment, however, all or substantially all information included in the router record is preserved.

The example router record of TABLE 5 is illustrated in TABLE 6 with the user ID and router names and signal strengths purged.

TABLE 6

| Record ID | Merchant ID | Date | Time | Grid Cell |
|---|---|---|---|---|
| 1234 | 456789 | MM/DD/YYYY | 14:03:52 | G |

After being purged, the router records are then transmitted, by the location provider 110, to the payment network 106, at 312. In at least one embodiment, however, the router records are transmitted to another part of the system 100 without purging information therefrom. The transmission of the router records may be initiated by the location provider 110, or by the payment network 106. The payment network 106 may modify the router records upon receipt from the location provider 110. For example, if a merchant name or merchant address is included, in lieu of a merchant ID, the payment network 106 may append the merchant ID. The payment network 106 may further filter un-used information, such as router names, signal strength, etc., if included in the router records. Ultimately, in this embodiment, the router records, filtered or unfiltered, are stored in the payment network 106, and in particular, the memory 204 of the computing device 200.

While the router records are transmitted from the location provider 110 to the payment network 106 in this embodiment, it should be appreciated that, in other embodiments, the location provider 110 may be incorporated in the payment network 106, or vice-versa, such that the transmission at 312 is unnecessary.

With further reference to FIG. 3, the payment network 106 accesses transaction records, at 314, stored in memory

TABLE 5

| Record ID | User ID | Router 1 Data | Router 2 Data | Router 3 Data | Merchant ID | Date | Time | Grid Cell |
|---|---|---|---|---|---|---|---|---|
| 1234 | 6789 | 116a/0.93 | 116b/0.20 | 116c/0.16 | 456789 | MM/DD/YYYY | 14:03:52 | G |

Referring again to FIG. 3, the location provider 110 may purge all or some of the identifying data included in the router records, at 310. For example, any information included in the router records, which may be associated or linked to the portable communication device 118, or consumer 114, may be purged prior to transmitting the router records to another part of system 100, including the payment network 106. In this manner, a purge may be implemented to ensure privacy of the consumer 114 (and other consumers), and/or to conform to privacy rules and/or regulations of the location provider 110, etc. In the example router record of TABLE 5, the user ID is purged, at 310.

204. The payment network 106 may access the transaction records, based on a variety of criteria, including the merchant ID, time, date, etc. In this example embodiment, the payment network 106 then accesses the transaction records based on merchant ID. It should be appreciated that, in lieu of the router records being transferred to the payment network 106, transaction records may be transferred from the payment network 106, whereby the location provider 110, or another entity, performs the method described herein. More generally, the router records and the transaction records may be received by one or more entities, described herein, or otherwise, to perform the methods herein. An exemplary transaction record is provided in TABLE 7.

TABLE 7

| Merchant ID | Date | Time | Amount |
|---|---|---|---|
| 456789 | MM/DD/YYYY | 14:03:56 | $8.42 |

After accessing the transaction records, at 314, the payment network 106 attempts to match each router record to a transaction record, at 316. In this exemplary embodiment, the payment network 106 matches the records based on time. Specifically, the payment network 106 matches the router records and the transaction records when the time of the router record and the time of the transaction record are within a predetermined interval. The predetermined interval may be 10 seconds, 20 seconds, 30 seconds, 60 seconds, 120 seconds, 180 seconds, or a different number of seconds or minutes. It should be appreciated that, in addition to or apart from time, other criteria may be used to match router records and transaction records. The criteria for matching the records are often different (possibly only in magnitude) than the criteria used to access the transaction records, but may be the same in some instances. The criteria may be based on, for example, the rate at which router records are generated/changed at the portable communication device 118, and/or the type of merchant (e.g., a consumer would likely be present at a nail salon, longer than a fast food restaurant), etc. For example, as shown in TABLE 8, the router record of TABLE 6 matches the transaction record of TABLE 7.

TABLE 8

| Record ID | Merchant ID | Date | Time | Cell | Transaction | Auth. Intensity |
|---|---|---|---|---|---|---|
| 1234 | 456789 | MM/DD/YYYY | 14:03:56 | G | YES | 47 |

Prior to or after searching for a match of the router records and transaction records, the payment network 106 may further, in some embodiments, filter certain records. In one embodiment, the payment network 106 may filter router records, transaction records, and/or matching records when the records occurred during a high intensity interval, i.e., an interval in which the authorization intensity for the target merchant 102 was above a predetermined threshold. For example, a coffee merchant may complete a transaction every 25 seconds between 7:30 am and 8:30 am, on August 3. If the matching of router records and transaction records is based on a 30-second predetermined interval, at 316, at least one match would be found for every router record between 7:30 am and 8:30 am on August 3. In this example, the payment network 106 eliminates either transaction records, router records, or matches within the high intensity interval (e.g., between 7:30 am and 8:30 am on August 3) to inhibit false positives from being reported. In various examples, the predetermined threshold may include, for example, a transaction about every 15 seconds, such that an interval (e.g., about 5, 10, 15, 60, or 90 minutes, generally, or before and after a transaction, etc.) in which, or for part of which, a merchant has a transaction every about 30 seconds, 20 seconds, 15 seconds, 10 seconds, 5 seconds, or less is a high intensity interval (depending, for example, on the type of merchant, size of merchant, number of POS terminals, or other factors indicative of the transaction frequency of a merchant, or other factors, etc.). In any event, for purposes of this disclosure, a high intensity is when the number of transactions is greater than one per 1-45 seconds (e.g., 15 second, 20 second, 45 second, etc.), for example, i.e., the predetermined threshold. Other thresholds (indicating a higher intensity, for example) may be employed in other embodiments depending on, for example, the type of merchant, concentration of merchants, historical transaction frequencies for the merchant, etc.

For each cell in the grid, in this embodiment, the payment network 106 counts the number of matches between the router records and the transaction records. For example, as shown in FIG. 6, each cell includes a count of router records (the denominator) and a count of the router records that have been matched to a transaction record (the numerator). After each router record is checked for a match with a transaction record, the payment network 106 reports, at 318, one or more of the cells of the grid structure in which a match was recorded, when the number of matching record exceeds a predetermined threshold. The predetermined threshold, in various embodiments, is determined by empirical data, such as, based on testing different thresholds on a validation set, where the 'truth' is known and finding the threshold that has the highest number, or most net positive identification (i.e., correct positive identifications minus false positive identifications). Predetermined thresholds may be different for different grids, or merchants, who may have different transaction frequencies.

Each reported cell is a potential location of the target merchant 102, or a point-of-sale (POS) terminal of the target merchant 102. In several embodiments, only one cell is reported by the payment network 106, indicating the target merchant 102 is more likely than not within that cell. In this and other embodiments, the payment network 106 may employ the Wilsons score interval, the minimum value of the Wilson score interval, and/or other suitable analytical methods known to those of skill in the art, to identify the cell to be reported. As should be appreciated, as the number of router records in a cell matching a transaction record increases, the probability of that cell corresponding to the location of the target merchant 102 increases. In this example, the cell "G" is reported as the cell in which the target merchant 102 is located.

It should be appreciated that the payment network 106 may report only the cell in which the number of matching router and transaction records exceeds a predetermined threshold. For example, to limit the ability of the location provider 110 to link the transaction record to the portable communication device 118 (or the consumer 114), the payment network 106 may require, in some embodiments, that at least 10 matches occur within 6 hours, 1 day, 2 days, or other durations, prior to reporting the cell as a location associated with the target merchant 102. In other embodiments, however, the payment service provider may transmit router records back to the location provider 110, whereby the location provider 110 reports and/or identifies the one or more cells associated with the merchant 102.

Referring again to FIG. 3, after reporting from the payment network 106, the location provider 110 may use the reported location of the merchant 102 to create and/or revise rules or other mechanisms for determining location of a portable communication device, through interaction with the routers 116. For example, the location provider 110 may have signal strength parameters for a cell in which certain merchants are located to portable communication devices, for example, in tabular form. In this manner, the portable communication device 118 may then, based on signal strengths or intensities of certain routers, relative to one or more signal strength or intensity ranges, be able to determine whether it is within a cell in which a merchant is located, indicating the portable communication device 118 is at the merchant 102. For example, TABLE 4 illustrates three signal intensity ranges (corresponding to one cell of the grid), if a portable communication device identified signals from router I-1, I-2, and I-3 to be 0.801, 0.908, and 0.947, respectively, the portable communication device is within that cell. If a merchant is also identified to that cell through the methods described herein, it is then true that the portable communication device is located at that merchant. A variety of different forms of mechanisms may be employed, so that the portable communication device 118 is able to interpret the signal strength or intensity of routers, available to the portable communication device 118, to determine its location at a merchant or other entity.

Figure 7:
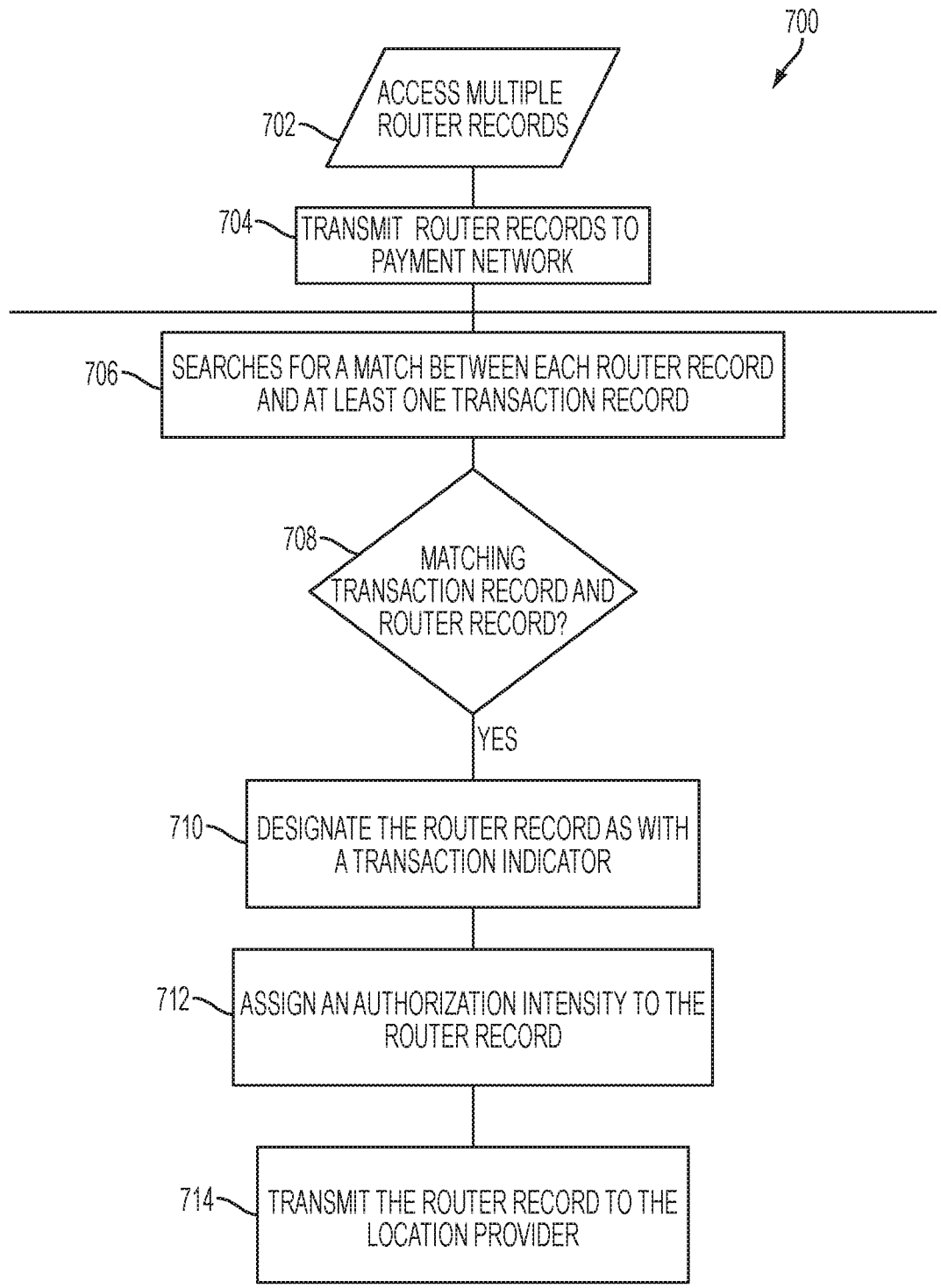
FIG. 7 is another exemplary method for use in identifying a merchant location based on transaction records associated with the merchant, that may be used in the system of FIG. 1.

FIG. 7 illustrates another exemplary method 700 for identifying a merchant location based on one or more transactions. Like method 300, method 700 is described with reference to the system 100, and in particular, operations of the location provider 110 and the payment network 106. It should be appreciated, however, that the method 700 may be implemented in any one or more of the merchant 102, the acquirer 104, the payment network 106, the issuer 108, and the location provider 110 of the system 100, as described above. It should be appreciated that the methods described herein are not limited to the system 100, and conversely, the systems described herein are not limited to the exemplary method 700.

As shown in FIG. 7, the location provider 110 accesses, at 702, the router records stored in memory 204. The location provider 110 generally accesses the router records based on a merchant ID of a target merchant, which, in this exemplary embodiment, is merchant 102. When a merchant ID is not included in the router records, other information, e.g., merchant name and/or merchant address, etc., may be used to access the router records. Additionally, or alternatively, the router record may be accessed based on time (e.g., time and date). The location provider 110 transmits the router records to the payment network 106, at 704. The router records may include a merchant ID, as indicated above, an identifier (e.g., record ID, etc.) and the time (e.g., time, date, or time and date, etc.) of the router record. The router specific information, such as router name and signal strength, as described above, may be included, or omitted, from the router records transmitted to the payment network 106. In some embodiments, the payment network 106 may access the router records, directly, or indirectly. For example, the router records may be transmitted to, or retrieved by the payment network 106, as described above, from the portable communication device 118, and other similar devices.

At 706, the payment network 106 searches for a match between the router records and transaction records. The payment network 106 may match the transaction record(s) based on time of the router records, and/or based on the merchant ID or other merchant-specific information. If the payment network 106 matches transaction records to the router records, at 708, the payment network 106, in this embodiment, designates the router record with a transaction indicator, at 710. A transaction indicator may include, for example, the "YES" designation illustrated above in TABLE 8.

In the exemplary method of FIG. 7, at 712, the payment network 106 further assigns an authorization intensity to the router records. Again, in the example of TABLE 8, the illustrated router record is assigned an authorization intensity of "47." The authorization intensity is indicative of the number of transactions per interval (e.g., ±10 minutes from a transaction time, etc.). The intensity may be scaled to be a number between 0 and 100, as in the example of TABLE 8, for example, to reduce the probability that the intensity indicates a precise number of transactions at the target merchant 102 for the particular interval. As indicated above, the authorization intensity may be indicative as to the accuracy of the matched router record. It should be appreciated that an intensity may be omitted in some embodiments.

After appending the transaction present indicator and the intensity to the router records, the payment network 106 transmits, at 714, the router records (in total, or in part, potentially depending on the router records received from the location provider 110, or other entity, etc.) to the location provider 110. The payment network 106 may, in some embodiments, transmit or report only a portion of the matched router records. For example, the payment network 106 may only transmit router records when the assigned authorization intensity exceeds a predefined intensity, thereby reducing the possibility of the location provider 110, or other entity, to identify the consumer 114 or portable communication device 118 for a particular transaction. The predefined intensity, when scaled between 0 and 100, may be 10, 15, 20, or some other intensity selected by the payment network 106, sufficient to mask particular transactions, or for one or more other reasons.

The location provider 110, in turn, uses the reported or transmitted router records to create and/or revise rules or other mechanisms for determining location of a portable communication device, through interaction with the routers 116, as described above.

The embodiments herein thus permit a location provider to locate portable communication devices when, for example, merchants are concentrated within a particular location, access to GPS signals is reduced, and/or other factors affect a portable communication device's ability to display its location accurately. Further, by linking router records and transaction records based on a grid cell, time, and/or merchant identifier (or other merchant information), the methods and systems herein may be effected without transmitting consumer-identifiable information between parts of system 100, in various embodiments.

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) accessing multiple router records, each router record assigned to one of multiple cells of a grid structure indicative of geographic location, each router record associated with a target merchant; (b) for each of the multiple router records, searching for a match between the router record and at least one of multiple transactions at the target merchant based on time; (c) reporting one or more of the multiple cells as a location associated with the target merchant, when a number of matching router records assigned to said one or more of the multiple cells exceeds a predetermined threshold; (d) filtering out ones of the routers record, transactions, or matches of router records and transactions, when the time of the router record and/or the transaction time of the transaction is within a high intensity interval; (e) generating the grid structure including the multiple cells, said cells being mutually exclusive of each other; (f) assigning the multiple router records to at least one of the multiple cells of the grid structure; (g) appending the merchant ID, the merchant name, and/or the merchant address to the router record based on one or more router names included in the router record; (h) purging data identifying a consumer or a portable communication device from each of the multiple router records; and (i) accessing the multiple transactions based on a merchant ID.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for identifying a location for a target merchant, the method comprising:

accessing multiple router records, each router record generated by a portable communication device moving within a range of and communicating with each of multiple routers, each router record including a geographic location associated with signal strengths of ones of the multiple routers recognized by the portable communication device and a temporal indicator specific to the signal strengths recognized by the portable communication device at a time and date indicated by the temporal indicator;

for each of the multiple router records, searching, by a computing device, for a match between the router record and at least one of multiple transactions associated with a target merchant based on the temporal indicator included in the router record; and reporting, by the computing device, the geographic location from one of the matching router records as a location associated with the target merchant, when a number of the matching router records including said geographic location exceeds a predetermined threshold, thereby identifying the location associated with the target merchant apart from use of a global positioning system (GPS).

2. The method of claim 1, wherein searching for a match between the router record and at least one of the multiple transactions includes searching for the match between the router record and at least one of the multiple transactions based on the time and date indicated by the temporal indicator of the router record being within a predetermined interval of a time of at least one of the multiple transactions.

3. The method of claim 2, further comprising filtering out one or more of the multiple router records or one or more of the multiple transactions associated with the target merchant when the time and date of said one or more of the multiple router records or the time of said one or more of the multiple transactions is within a high intensity interval; and wherein the high intensity interval includes an interval in which an authorization intensity of the target merchant is above a predetermined threshold.

4. The method of claim 1, wherein the geographic location is indicative of one of multiple cells of a grid structure; and wherein the method further comprises:

generating the grid structure having the multiple cells, said cells being mutually exclusive of one another; and assigning each of the multiple router records to one of the multiple cells of the grid structure.

5. The method of claim 4, wherein generating the grid structure includes clustering various router records within at least one standard deviation of a center of the cluster, whereby each cluster defines one of the multiple cells of the grid structure; and wherein generating the grid structure includes generating the grid structure such that no more than one merchant is included in each of the multiple cells.

6. The method of claim 1, wherein each of the multiple router records includes a merchant ID, a merchant name, and/or a merchant address.

7. The method of claim 6, further comprising, for each of the multiple router records, appending the merchant ID, the merchant name, and/or the merchant address to the router record based on a router name included in the router record.

8. The method of claim 1, further comprising:

accessing, by a location provider, the multiple router records;

purging data identifying a consumer or a portable communication device from each of the multiple router records; and transmitting the purged router records to a payment network;

wherein for each of the multiple router records, searching, by the computing device, for a match between the router record and at least one of the multiple transactions includes, for each of the purged router records, searching for the match between the purged router record and at least one of the multiple transactions.

9. The method of claim 1, further comprising:

accessing, by a location provider, the multiple router records;

creating a router graph based on the multiple accessed router records;

generating a grid structure through agglomerative distance based clustering of the router graph; and assigning each of the multiple router records to one of the multiple cells of the grid structure, the geographic location reported as the location associated with the target merchant including the one of the multiple cells of the grid.

10. The method of claim 1, further comprising accessing the multiple transactions associated with the target merchant based on a merchant ID for the target merchant; and wherein searching for a match between the router record and at least one of the multiple transactions includes searching for the match between the router record and at least one of the multiple transactions further based on the merchant ID.

11. A system for identifying a merchant location based on one or more transactions, the system comprising:

a memory including a data structure, the data structure including multiple transaction records associated with a target merchant; and a processor coupled to the memory and configured to:

access multiple router records, each router record generated by a portable communication device moving within a range of and communicating with each of multiple routers, each router record including a geographic location associated with signal strengths of ones of the multiple routers recognized by the portable communication device and a time and date at which the signal strengths of the ones of the multiple routers were recognized by the portable communication device;

for each of the multiple router records, search for a match between the router record and at least one of the multiple transaction records associated with the target merchant, based on a consistency between the time and date of the router record and a time and date of the at least one of the multiple transaction records;

for each matching router record:

designate the router record with a transaction indicator, whereby the transaction indicator indicates a match between the time and date of the router record and the time and date of the transaction record; and assign to the router record an authorization intensity indicative of a number of transactions at the target merchant for a particular interval; and report one or more of the matching router records to a location provider based on the authorization intensity exceeding a predefined intensity.

12. The system of claim 11, wherein the processor is further configured to:

generate a grid structure indicative of geographic location, the grid structure including multiple, mutually exclusive cells with no more than one merchant being located within each of the multiple cells; and assign each of the multiple router records to one of the multiple cells.

13. The system of claim 11, wherein each of the multiple router records is assigned to a grid structure having multiple cells; and wherein the processor is configured to report the one of more of the matching router records further when the router record is assigned to one of the multiple grid cells and a number of matched router records assigned to said one of the multiple cells exceeds a predetermined threshold.

14. The system of claim 11, wherein each router record includes a merchant ID, a merchant name, and/or a merchant address; and wherein the processor is configured to search based on the merchant ID, the merchant name, and/or the merchant address for the match between the router record and the at least one of the multiple transaction records.

15. The system of claim 11, wherein the processor is configured to search for the match between the router record and the at least one of multiple transaction records based on the time and date of the router record being within a predetermined interval of the time and date of the at least one of the multiple transaction records.

16. The system of claim 11, wherein the processor is further configured to identify the location of the target merchant based on the router specific data in at least some of the matched router records.

17. A non-transitory computer-readable storage media comprising instructions that, when executed by at least one processor, cause the at least one processor to:

access multiple router records, each router record generated by a portable communication device moving within a range of and communicating with each of multiple routers, each router record including signal strengths of ones of the multiple routers as recognized by the portable communication device and a temporal indicator specific to a time and date at which the signal strengths are recognized by the portable communication device;

for each of the multiple router records:

append a geographic location to the router record and purge at least the signal strengths of ones of the multiple routers from said router record;

search for a match between the purged router record and at least one of multiple transactions associated with a target merchant based on the temporal indicator included in the router record; and reporting the geographic location from one of the purged router records as a location associated with the target merchant, when a number of the matching purged router records assigned to include said geographic location exceeds a predetermined threshold.

18. The non-transitory computer-readable storage media of claim 17, wherein the instructions, when executed by the at least one processor, further cause the at least one processor to generate a grid structure including multiple cells, said cells being mutually exclusive of one another; and wherein the reported geographic location includes one of the multiple cells associated with the signal strengths included in the one of the purged router records.

19. The method of claim 1, wherein each router record is further assigned to one of multiple cells of a grid structure indicative of the geographic location included in the router record, each of the multiple cells associated with signal strengths of ones of the multiple routers; and wherein each router record further includes a grid structure cell designation specific to one of the multiple cells of the grid structure to which the router record is assigned, based on the signal strengths recognized by the portable communication device being within the associated signal strengths of the one of the multiple cells of the grid structure.

20. The method of claim 1, wherein each router record is assigned to one of multiple cells of a grid structure indicative of the geographic location included in the router record;

wherein the method further comprises, for each one of the multiple cells of the grid structure, counting a number of matches between one or more router records assigned to the one of the multiple cells of the grid structure and ones of the multiple transactions associated with the target merchant; and wherein reporting the geographic location from one of the matching router records as a location associated with the target merchant includes reporting one or more of the multiple cells as a location associated with the target merchant based on the counted number of matching router records assigned to said one or more of the multiple cells exceeding the predetermined threshold.

21. The method of claim 1, further comprising creating at least one rule, based on at least one signal strength range for at least one of the multiple routers, for determining a location of another portable communication device based on the reported geographic location as the location associated with the target merchant, thereby permitting the location of the another portable communication device to be determined apart from use of a GPS.

22. The method of claim 4, wherein each of the multiple cells is associated with signal strengths of ones of the multiple routers; and wherein assigning each of the multiple router records to one of the multiple cells of the grid structure includes assigning each of the multiple router records to one of the multiple cells of the grid structure based on the signal strengths recognized by the portable communication device being within the signal strengths of the one of the multiple cells of the grid structure.

23. The method of claim 4, wherein each of the multiple cells is associated with signal strengths of ones of the multiple routers located in or around the geographic location.

24. The method of claim 4, wherein each of the multiple cells is associated with a range of signal strengths of ones of the multiple routers.

* * * * *